US011766962B2

(12) United States Patent
Sakakibara et al.

(10) Patent No.: US 11,766,962 B2
(45) Date of Patent: Sep. 26, 2023

(54) ON-VEHICLE STORAGE DEVICE

(71) Applicant: TOYODA GOSEI CO., LTD., Kiyosu (JP)

(72) Inventors: Yasuhiro Sakakibara, Kiyosu (JP); Kohei Yoshida, Kiyosu (JP); Yu Hishida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/905,984

(22) Filed: Jun. 19, 2020

(65) Prior Publication Data

US 2021/0009022 A1    Jan. 14, 2021

(30) Foreign Application Priority Data

Jul. 11, 2019  (JP) .................................. 2019-129492

(51) Int. Cl.
*B60N 3/10*    (2006.01)

(52) U.S. Cl.
CPC ................................... *B60N 3/103* (2013.01)

(58) Field of Classification Search
CPC ................................ B60N 3/103; B60N 3/101
USPC .......................................... 224/544; 220/351
See application file for complete search history.

(56) References Cited

U.S. PATENT DOCUMENTS

| | | | | |
|---|---|---|---|---|
| 1,660,540 | A * | 2/1928 | Wulftange | A47J 37/108 220/345.2 |
| 2,093,508 | A * | 9/1937 | Seymour | B65D 43/12 220/351 |
| 2,102,094 | A * | 12/1937 | Romig | B65D 43/12 220/351 |
| 2,295,747 | A * | 9/1942 | Mills | B65D 43/12 220/351 |

(Continued)

FOREIGN PATENT DOCUMENTS

| | | |
|---|---|---|
| JP | H06-022808 A | 2/1994 |
| JP | 2005-112221 A | 4/2005 |

(Continued)

OTHER PUBLICATIONS

Reasons for Refusal dated Aug. 2, 2022 issued for the corresponding Japanese Application No. 2019-129492 (and English machine translation).

*Primary Examiner* — Nathan J Newhouse
*Assistant Examiner* — Lester L Vanterpool
(74) *Attorney, Agent, or Firm* — POSZ LAW GROUP, PLC (57) ABSTRACT

Provided is an on-vehicle storage device 1 that includes: a storage box 2 including a box body 20 having a storage space 21 and having an upward-facing opening 22, and a box peripheral portion 25 disposed at a peripheral edge of the opening 22; and a design panel 3 disposed on an upper side of the storage box 2 and having a window portion 32 facing the opening 22, and a design window frame portion 35 that is disposed at a peripheral edge of the window (Continued)

portion 32 and that faces the box peripheral portion 25. The design window frame portion 35 and the box peripheral portion 25 are slidable relative to each other in a first direction intersecting an up-down direction while engaging with each other. The storage box 2 and the design panel 3 are combined with each other by sliding in the first direction.

8 Claims, 5 Drawing Sheets

(56) References Cited

U.S. PATENT DOCUMENTS

| | | | |
|---|---|---|---|
| 2,793,092 A * | 5/1957 | Peterson | B60N 3/083 |
| | | | 312/246 |
| 3,205,764 A * | 9/1965 | Letter | G01N 21/0303 |
| | | | 356/246 |
| 3,630,343 A * | 12/1971 | Wohl | B60R 7/08 |
| | | | 224/928 |
| 4,174,034 A * | 11/1979 | Hoo | B65D 11/12 |
| | | | 206/1.5 |
| 4,342,403 A * | 8/1982 | Badtke | B65D 43/12 |
| | | | 206/540 |
| 4,967,995 A * | 11/1990 | Burgess | F25C 1/24 |
| | | | 220/350 |
| 5,080,222 A * | 1/1992 | McNary | B65D 43/12 |
| | | | 220/345.3 |
| 5,188,234 A | 2/1993 | Fukuda et al. | |
| 5,474,199 A * | 12/1995 | Julius | B65D 43/161 |
| | | | 220/837 |
| 6,210,638 B1 * | 4/2001 | Grieco | A61L 2/26 |
| | | | 422/297 |
| D595,125 S * | 6/2009 | Doyle | D3/298 |
| 8,540,113 B2 * | 9/2013 | Bailey | B65D 43/164 |
| | | | 220/810 |
| 10,173,589 B2 | 1/2019 | Takahama | |
| 10,386,566 B2 * | 8/2019 | Ueno | G02B 6/0046 |
| 2004/0108318 A1 * | 6/2004 | Wang | B65D 43/12 |
| | | | 220/345.2 |
| 2004/0217116 A1 * | 11/2004 | Offerman | B65D 43/12 |
| | | | 220/345.2 |
| 2005/0092763 A1 * | 5/2005 | Haggerty | B65D 83/0864 |
| | | | 220/812 |
| 2010/0072206 A1 * | 3/2010 | Doyle | B65D 25/54 |
| | | | 220/345.2 |
| 2017/0182937 A1 | 6/2017 | Takahama | |

FOREIGN PATENT DOCUMENTS

| | | |
|---|---|---|
| JP | 2007-290458 A | 11/2007 |
| JP | 2011-131793 A | 7/2011 |
| JP | 2015-223968 A | 12/2015 |

* cited by examiner

ON-VEHICLE STORAGE DEVICE

TECHNICAL FIELD

The present invention relates to an on-vehicle storage device.

BACKGROUND ART

Various storage devices such as drink holders and small article cases are mounted to vehicles. As this type of on-vehicle storage device, a storage device that includes a storage box having a storage space and a design panel disposed on the upper side of the storage box is known.

For the on-vehicle storage device that includes the storage box and the design panel, the design panel is disposed on the storage box, and the storage box and the design panel are fixed to each other by screws, thereby attaching the design panel to the storage box, in general (for example, see JP2015-223968A).

JP2015-223968A discloses a cup holder which includes a finisher member as a design panel and a cup holder body as a storage box. JP2015-223968A indicates in paragraph [0021] that the design panel and the storage box are fixed to each other from the lower side by screws.

SUMMARY OF INVENTION

Technical Problem

The technique as disclosed in JP2015-223968A is advantageous in that, when the design panel is disposed on the storage box, and both the design panel and the storage box are fixed to each other from the lower side by screws, the storage box and the design panel are combined with each other with high quality design since the screws are not exposed on the upper side of the on-vehicle storage device, that is, on the design surface side. However, the worker needs to screw the storage box and the design panel to each other from the lower side in a state where the worker has difficulty in seeing her/his hands. Therefore, the work becomes bothersome and workability is low. Furthermore, in this manner, a lot of screws need to be used for combining the storage box and the design panel with each other, so that reduction of the number of components is difficult. Thus, the technique disclosed in JP2015-223968A has a problem that the production cost of the on-vehicle storage device is difficult to reduce.

The present invention has been made in view of the aforementioned circumstances, and an object of the present invention is to provide an on-vehicle storage device which includes a storage box and a design panel and allows the storage box and the design panel to be easily combined with each other.

Solution to Problem

In order to solve the aforementioned problem, the on-vehicle storage device of the present invention is directed to an on-vehicle storage device that includes: a storage box including a box body having a storage space and having an upward-facing opening, and a box peripheral portion disposed at a peripheral edge of the opening; and a design panel disposed on an upper side of the storage box, the design panel configured to have a window portion facing the opening, and a design window frame portion that is disposed at a peripheral edge of the window portion and that faces the box peripheral portion. The design window frame portion and the box peripheral portion are slidable relative to each other in a first direction intersecting an up-down direction while engaging with each other. The storage box and the design panel are combined with each other by sliding in the first direction.

The on-vehicle storage device of the present invention has a storage box and a design panel and allows the storage box and the design panel to be easily combined with each other.

DESCRIPTION OF EMBODIMENTS

An on-vehicle storage device of the present invention has a storage space. The on-vehicle storage device of the present invention allows various articles such as a drink container to be stored in the storage space.

The on-vehicle storage device of the present invention includes a storage box and a design panel disposed on the upper side of the storage box. The design panel covers the storage box from at least the upper side.

The storage box has a box body and a box peripheral portion. The box body has the storage space and has an upward-facing opening. Meanwhile, the design panel has a window portion that faces the opening of the storage box. Therefore, the storage space of the storage box connects to the outside of the on-vehicle storage device of the present invention through the opening and the window portion.

The box peripheral portion is disposed at the peripheral edge of the opening of the storage box, and a design window frame portion is disposed at the peripheral edge of the window portion of the design panel. The design window frame portion faces the box peripheral portion, and the design window frame portion and the box peripheral portion are slidable relative to each other while engaging with each other. The direction in which the design window frame portion and the box peripheral portion slide is a direction intersecting the direction in which the design window frame portion and the box peripheral portion are stacked, that is, a direction intersecting the up-down direction. In the description herein, this sliding direction is referred to as a first direction.

In the on-vehicle storage device of the present invention, the design window frame portion and the box peripheral portion slide in the first direction while engaging with each other. Therefore, in the on-vehicle storage device of the present invention, the storage box having the box peripheral portion and the design panel having the design window frame portion slide in the first direction to combine the storage box and the design panel with each other.

In the on-vehicle storage device of the present invention, the storage box and the design panel slide while engaging with each other to combine the storage box and the design panel with each other. This combination does not require screws and the like, and is very simple. Furthermore, since no screws are required, the number of components is substantially reduced, thereby facilitating management of the components. The on-vehicle storage device, of the present invention, having such a structure facilitates combination of the storage box and the design panel.

The on-vehicle storage device of the present invention will be described below for each component.

In the on-vehicle storage device of the present invention, the storage box has the box body and the box peripheral portion as described above. The shape of the storage box is determined as appropriate according to an article to be stored in the storage space.

The box peripheral portion is preferably shaped so as to slide while engaging with the design window frame portion of the design panel. The box peripheral portion is disposed, for example, at a part of the peripheral edge of the opening or at the entirety of the peripheral edge. At least one of the box peripheral portion and the design window frame portion is preferably disposed along the direction in which the box peripheral portion and the design window frame portion slide, that is, along the first direction, over the entire length over which the box peripheral portion and the design window frame portion slide, so as to allow the box peripheral portion and the design window frame portion to slide while stably engaging with each other.

The design panel is a member that covers the storage box from the upper side, and allows the on-vehicle storage device of the present invention to exhibit excellent quality design. The design window frame portion of the design panel faces the box peripheral portion, and is exposed on the upper side of the on-vehicle storage device of the present invention. In consideration of the design effect for the on-vehicle storage device, the design window frame portion of the design panel preferably covers the entirety of the upper surface of the box peripheral portion.

The design window frame portion and the box peripheral portion are shaped so as to slide relative to each other in the first direction while engaging with each other. One of the design window frame portion and the box peripheral portion having such structures preferably has a slide groove that extends in the first direction. When the other of the design window frame portion and the box peripheral portion is inserted in the slide groove and slides in the slide groove in the first direction, the design window frame portion and the box peripheral portion slide relative to each other in the first direction while engaging with each other.

Hereinafter, the direction orthogonal to the first direction is referred to as a second direction as appropriate.

As long as one of the design window frame portion and the box peripheral portion has the slide groove that extends in the first direction, the slide groove is disposed in either the design window frame portion or the box peripheral portion. As long as the slide groove extends in the first direction, the slide groove is opened in any direction. From the viewpoint that the design window frame portion covers the box peripheral portion, preferably, the box peripheral portion is plate-shaped, and at least a part of the plate-shaped box peripheral portion is inserted in the slide groove formed in the design window frame portion. In this case, preferably, the slide grooves are formed at both end portions, in the second direction, of the design window frame portion, and extend in the first direction and are opened toward the center.

Specifically, both the end portions, in the second direction, of the design window frame portion are preferably each shaped to have, at a part in the first direction, a design wall that covers the upper surface of the box peripheral portion, an engaging wall that covers the lower surface of the box peripheral portion, and a connecting wall that extends in the up-down direction, and connects between the design wall and the engaging wall. A portion surrounded by the design wall, the engaging wall, and the connecting wall is the slide groove described above. A portion, of the box peripheral portion, which is covered by the design wall, the engaging wall, and the connecting wall engages with the design window frame portion in the slide groove, and slides relative to the design window frame portion.

In order to stably maintain engagement between the box peripheral portion and the design window frame portion, at least one of the box peripheral portion and the design window frame portion is preferably engaged with the other thereof while being elastically deformed. Thus, the box peripheral portion and the design window frame portion are brought into pressure contact with each other while engaging with each other, and the frictional force inhibits the box peripheral portion and the design window frame portion from disengaging from each other.

Either the box peripheral portion or the design window frame portion is elastically deformed, or both the box peripheral portion and the design window frame portion are elastically deformed. Furthermore, the elastically deformable portion of the box peripheral portion and/or the design window frame portion is a part or the entirety of the box peripheral portion and/or the design window frame portion. From the viewpoint of workability for combining the storage box and the design panel with each other, a part of the design window frame portion is preferably elastically deformed and the storage box is preferably rigid.

In a case where the design window frame portion that has the design wall, the connecting wall, and the engaging wall described above are elastically deformed, for example, the positions or the states of the connecting wall and the engaging wall are changed relative to the design wall in the direction in which the slide groove opens. Alternatively, the position or the state of the engaging wall is changed relative to the design wall and the connecting wall in the direction in which the slide groove opens. In either case, the design wall and the engaging wall hold the box peripheral portion in the thickness direction due to elastic restoring force, whereby the box peripheral portion and the design window frame portion are inhibited from disengaging from each other.

Furthermore, in order to more stably maintain engagement between the box peripheral portion and the design window frame portion, a locking element preferably inhibits the storage box and the design panel from moving relative to each other in the direction opposite to the combining direction in the first direction. In the on-vehicle storage device of the present invention in which the box peripheral portion and the design window frame portion engage with each other, the engaged state is stably maintained by the storage box and the design panel being inhibited from moving relative to each other in the direction opposite to the combining direction.

As such a locking element, an unlocking-prohibiting structure such as a known claw fitting structure is used, or an unlockable structure such as a heart cam mechanism is used. In either case, one of the locking elements is disposed in the storage box, and the other of the locking elements is disposed in the design panel, and the storage box and the design panel are preferably locked when sliding of the storage box and the design panel relative to each other in the first direction has been completed.

The on-vehicle storage device will be described below by using a specific example.

Embodiment 1

Figure 1:
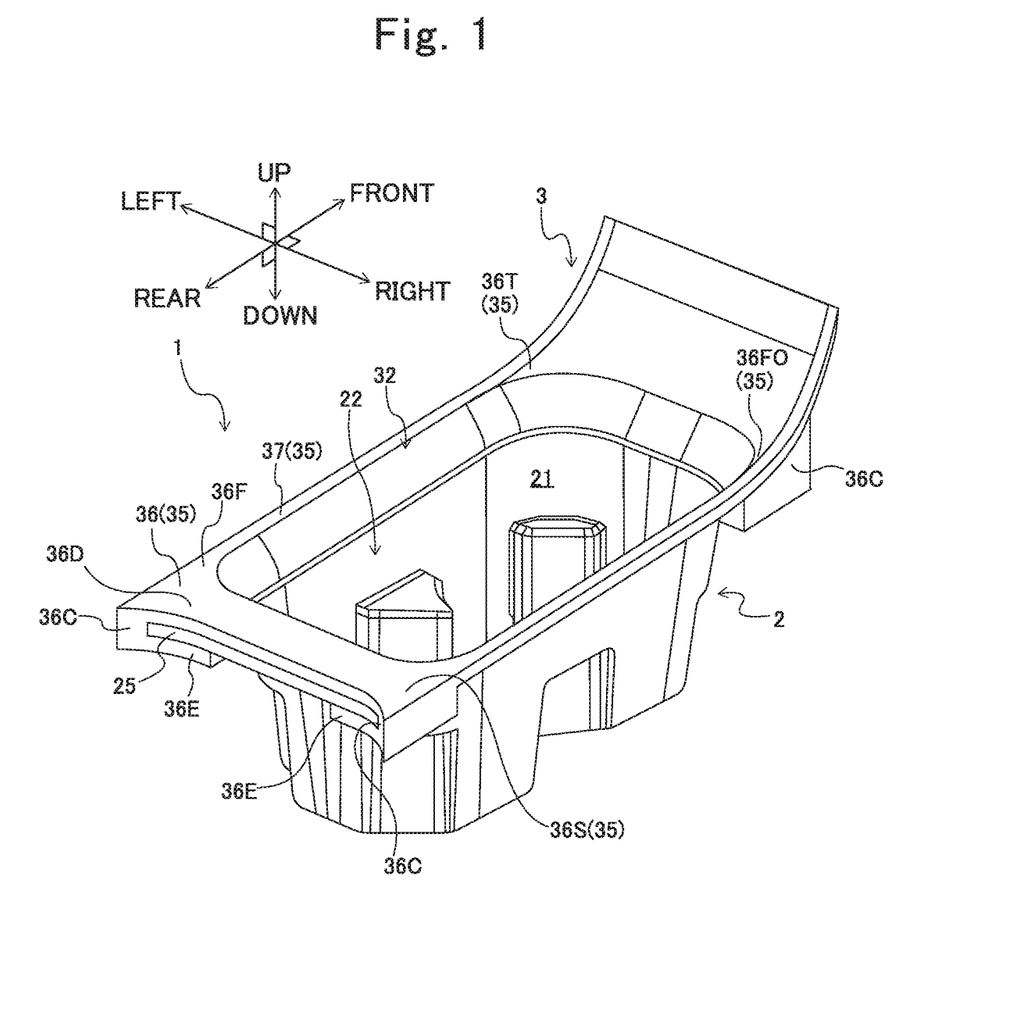
FIG. 1 schematically illustrates an on-vehicle storage device according to embodiment 1.
Figure 2:
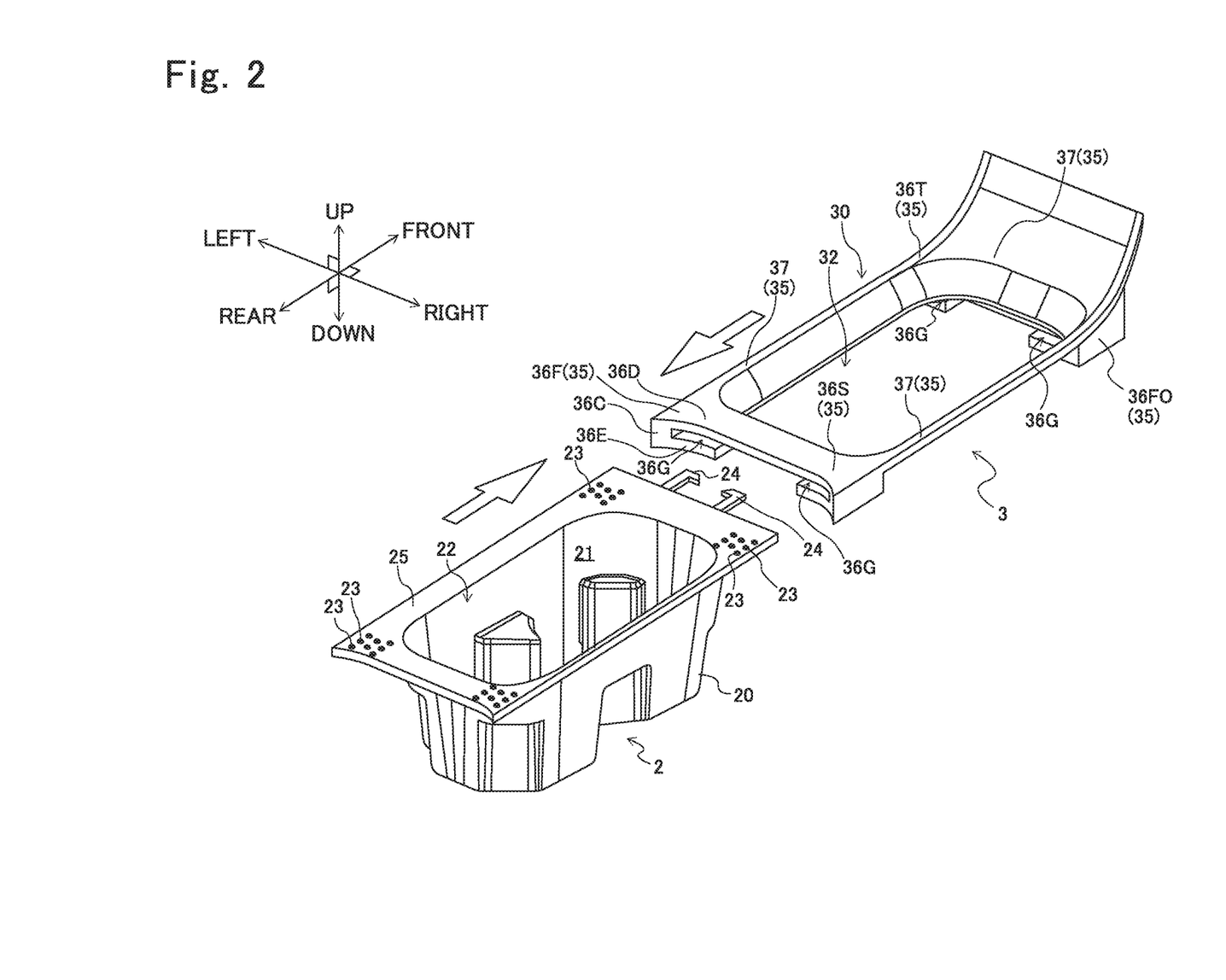
FIG. 2 schematically illustrates the on-vehicle storage device in a disassembled state according to embodiment 1.
Figure 3:
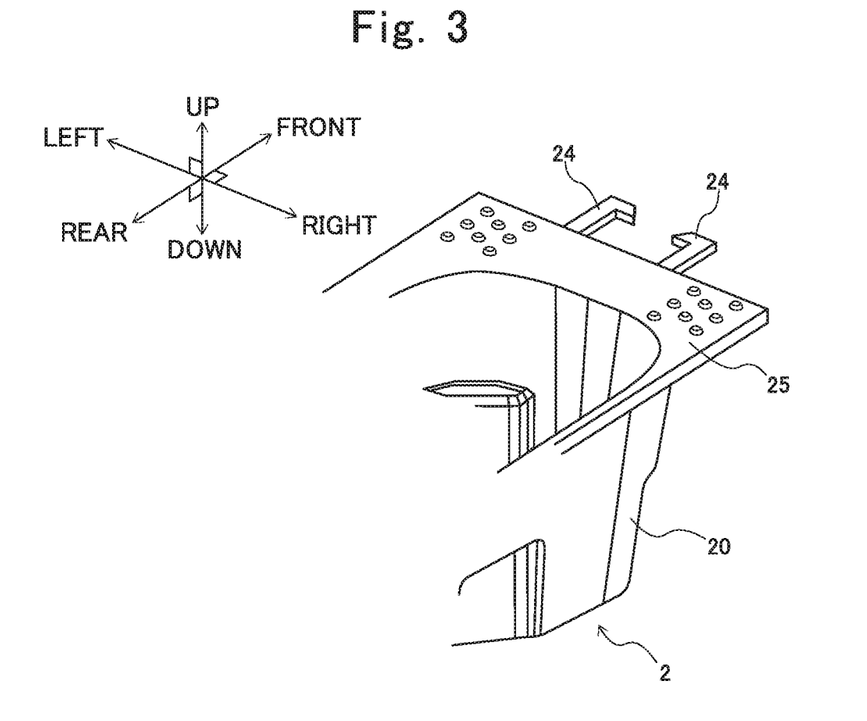
FIG. 3 schematically illustrates a front side portion of a storage box in the on-vehicle storage device according to embodiment 1.
Figure 4:
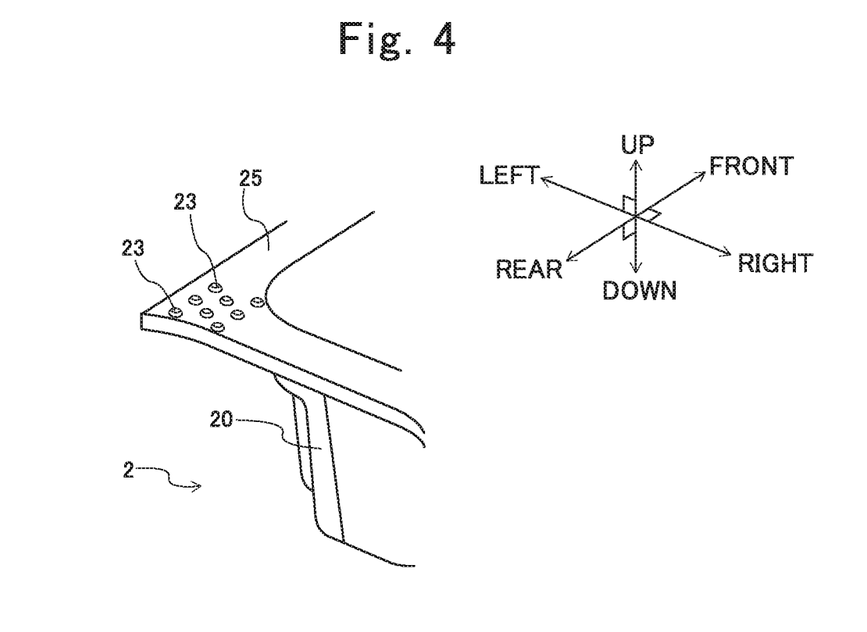
FIG. 4 schematically illustrates a rear side portion of the storage box in the on-vehicle storage device according to embodiment 1.

FIG. 1 schematically illustrates an on-vehicle storage device according to embodiment 1. FIG. 2 schematically illustrates the on-vehicle storage device in a disassembled state according to embodiment 1. FIG. 3 schematically illustrates a front side portion of a storage box in the on-vehicle storage device according to embodiment 1. FIG. 4 schematically illustrates a rear side portion of the storage box in the on-vehicle storage device according to embodiment 1. Hereinafter, the up, down, left, right, front, and rear represent the up, down, left, right, front, and rear indicated in the drawings. The up-down direction corresponds to the vertical direction, the front-rear direction corresponds to the vehicle traveling direction, and the left-right direction corresponds to the vehicle width direction. Furthermore, the front-rear direction is the first direction in the on-vehicle storage device of the present invention, and the left-right direction is the second direction orthogonal to the front-rear direction.

As shown in FIG. 1, an on-vehicle storage device 1 of embodiment 1 includes a storage box 2 and a design panel 3. The storage box 2 and the design panel 3 are integrally combined with each other, and the storage box 2 is disposed on the lower side and the design panel 3 is disposed on the upper side. In the on-vehicle storage device 1 of embodiment 1, the storage box 2 and the design panel 3 are formed of an elastically deformable resin material. Specifically, the storage box 2 and the design panel 3 are formed of polycarbonate.

As shown in FIG. 2, the storage box 2 has a box body 20 that is almost box-shaped, and a box peripheral portion 25 integrated with the upper end portion of the box body 20.

The box body 20 has an upward-facing opening. In the box body 20, a storage space 21 is defined, and the storage space 21 connects to the outside of the box body 20 through an opening 22.

The box peripheral portion 25 surrounds the peripheral edge of the opening 22 of the box body 20 over the entire periphery of the opening 22. The box peripheral portion 25 has an almost plate-frame-like shape as a whole. The box peripheral portion 25 extends in the left-right direction and the front-rear direction. In other words, the box peripheral portion 25 extends in the direction that is substantially orthogonal to the direction in which the opening 22 faces.

In other words, the storage box 2 includes the box body 20 that is a box-like portion, and the box peripheral portion 25 that is a bezel-like portion.

The design panel 3 has an almost plate-like shape and includes a window portion 32, and a design window frame portion 35 disposed at the peripheral edge of the window portion 32. As shown in FIG. 1, the window portion 32 faces the opening 22 of the storage box 2 from the upper side, and the design window frame portion 35 faces the box peripheral portion 25 of the storage box 2 from the upper side.

The window portion 32 penetrates through the design panel 3 in the up-down direction, that is, in the thickness direction. The window portion 32 has an almost mortar-like shape in which the dimension of the outer shape is gradually reduced from the upper side toward the lower side. In the window portion 32, the dimension of the outer shape of the lower end portion is slightly less than the dimension of the outer shape of the opening 22. Therefore, the design panel 3 covers the opening 22 of the storage box 2 from the upper side.

The design window frame portion 35 surrounds the peripheral edge of the window portion 32 of the design panel 3 over the entire periphery of the window portion 32. A portion having an almost L-shaped cross-section is disposed at each of the four corners of the design window frame portion 35. The other portions of the design window frame portion 35 are almost plate-shaped.

The portions at the four corners of the design window frame portion 35 are each referred to as an elastically-deformable portion 36, and the other portions are each referred to as a general portion 37. Among the elastically-deformable portions 36, the elastically-deformable portion 36 disposed on the rear left side is referred to as a first elastically-deformable portion 36F, the elastically-deformable portion 36 disposed on the rear right side is referred as a second elastically deformable portion 36S, the elastically-deformable portion 36 disposed on the front left side is referred to as a third elastically-deformable portion 36T, and the elastically-deformable portion 36 disposed on the front right side is referred to as a fourth elastically-deformable portion 36FO, as necessary.

As shown in FIG. 1 and FIG. 2, each of the elastically-deformable portions 36 includes a design wall 36D, an engaging wall 36E, and a connecting wall 36C.

The design wall 36D is flush with the general portion 37, and smoothly connects with the general portion 37 so as to form an almost plate-like shape. The almost plate-like portion formed by the design wall 36D and the general portion 37 is disposed so as to be substantially parallel to the box peripheral portion 25, and covers the upper surface of the box peripheral portion 25. Therefore, in other words, the design wall 36D and the general portion 37 extend in the direction orthogonal to the up-down direction, that is, extend in almost the front-rear direction and almost the left-right direction.

The engaging wall 36E extends so as to be substantially parallel to the design wall 36D, and is disposed below the design wall 36D. A distance between the engaging wall 36E and the design wall 36D is almost the same as the thickness of the box peripheral portion 25.

The connecting wall 36C extends in almost the up-down direction. Among the elastically-deformable portions 36 at the four corners of the design window frame portion 35, the connecting wall 36C connects between the design wall 36D and the engaging wall 36E at the left end portion in the first elastically-deformable portion 36F and the third elastically-deformable portion 36T disposed on the left side, and the connecting wall 36C connects between the design wall 36D and the engaging wall 36E at the right end portion in the second elastically-deformable portion 36S and the fourth elastically-deformable portion 36FO disposed on the right side. Therefore, an almost L-shaped portion formed by the engaging wall 36E and the connecting wall 36C is integrated with the design wall 36D of each elastically-deformable portion 36.

Among the elastically-deformable portions 36, the first elastically-deformable portion 36F and the third elastically-deformable portion 36T disposed on the left side are opened rightward, and the second elastically-deformable portion 36S and the fourth elastically-deformable portion 36FO disposed on the right side are opened leftward. In each of the elastically-deformable portions 36, a slide groove 36G is defined.

As shown in FIG. 2, the box peripheral portion 25 has a plurality of projections 23 disposed at positions which face the design wall 36D of each elastically-deformable portion 36. Each projection 23 has a projection height of about 0.05 mm. As shown in FIG. 4, each projection 23 has a semi-spherical shape, and the projections 23 adjacent to each other are spaced from each other.

As shown in FIG. 3, the box peripheral portion 25 has fitting claws 24 that project forward. A not-illustrated fitting hole into which each fitting claw 24 fits is disposed at the front lower side portion of the design panel 3. The fitting claws 24 and the fitting holes form a locking element of the on-vehicle storage device 1 of embodiment 1.

In the on-vehicle storage device 1 of embodiment 1, when the storage box 2 and the design panel 3 are combined with each other, the design panel 3 is firstly disposed on the upper front side of the storage box 2 as shown in FIG. 2, and the front left and right end portions of the box peripheral portion 25 are disposed in the slide groves 36G of the first elastically-deformable portion 36F and the second elastically-deformable portion 36S.

The design panel 3 and the storage box 2 slide relative to each other in the front-rear direction by moving the design panel 3 in the rearward direction. Thus, the box peripheral portion 25 is inserted into the slide grooves 36G of the first elastically-deformable portion 36F and the second elastically-deformable portion 36S, the box peripheral portion 25 and the slide grooves 36G engage with each other, and the design window frame portion 35 and the box peripheral portion 25 slide relative to each other in the front-rear direction, that is, in the first direction.

The box peripheral portion 25 has the plurality of projections 23. Therefore, a space between the engaging wall 36E and the design wall 36D is widened by the distance corresponding to the height of the projection 23. Therefore, the first elastically-deformable portion 36F and the second elastically-deformable portion 36S are slightly elastically deformed so as to open the slide grooves 36G, and the first elastically-deformable portion 36F and the second elastically-deformable portion 36S come into pressure contact with the box peripheral portion 25.

When the design panel 3 is slid rearward as it is, the front left and right end portions of the box peripheral portion 25 face the third elastically-deformable portion 36T and the fourth elastically-deformable portion 36FO. When the design panel 3 is further slid, the box peripheral portion 25 is inserted into the slide grooves 36G of the third elastically-deformable portion 36T and the fourth elastically-deformable portion 36FO, and the box peripheral portion 25 and the slide grooves 36G engage with each other. Also in this case, a space between the engaging wall 36E and the design wall 36D is widened by the distance corresponding to the height of the projection 23, and the third elastically-deformable portion 36T and the fourth elastically-deformable portion 36FO come into pressure contact with the box peripheral portion 25.

When the design panel 3 is further slid, the fitting claws 24 are inserted into the not-illustrated fitting holes, and the fitting claws 24 and the fitting holes fit to each other. Thus, in the on-vehicle storage device 1 of embodiment 1, combination of the storage box 2 and the design panel 3 is completed.

In the on-vehicle storage device 1 of embodiment 1, the storage box 2 and the design panel 3 are combined with each other merely by sliding relative to each other in the first direction. Therefore, when the on-vehicle storage device 1 of embodiment 1 is produced, the storage box 2 and the design panel 3 are easily combined with each other.

The design window frame portion 35 of the design panel 3 includes the elastically-deformable portions 36 which are elastically deformed when engaging with the box peripheral portion 25 of the storage box 2. The elastically-deformable portions 36 come into pressure contact with the box peripheral portion 25 due to the elastic restoring force of the elastically-deformable portions 36. Thus, the on-vehicle storage device 1 of embodiment 1 stably maintains engagement between the design window frame portion 35 and the box peripheral portion 25.

Furthermore, since the fitting claws 24 are inserted into the not-illustrated fitting holes, and the fitting claws 24 and the fitting holes fit to each other, the storage box 2 and the design panel 3 are inhibited from moving relative to each other in the direction opposite to the combining direction in the first direction, to more stably maintain engagement between the design window frame portion 35 and the box peripheral portion 25.

In the on-vehicle storage device 1 of embodiment 1, through these conjunctions, in addition to the storage box 2 and the design panel 3 being easily combined with each other, disengagement of the storage box 2 and the design panel 3 from each other is also inhibited.

In the on-vehicle storage device 1 of embodiment 1, the box peripheral portion 25 has the projections 23. The projections 23 are disposed at positions that face the design wall 36D of each elastically-deformable portion 36, as shown in FIG. 2 and FIG. 4. The positions of the projections 23 are not limited to the positions shown in FIG. 4. For example, the projections 23 are allowed to be disposed at both positions that face the design wall 36D and positions that face the engaging wall 36E in each elastically-deformable portion 36. Alternatively, the projections 23 are disposed only at positions that face the engaging wall 36E in each elastically-deformable portion 36. In any case, the sum of the height of the projection 23 and the thickness of the box peripheral portion 25 is slightly greater than the distance between the design wall 36D and the engaging wall 36E. For example, (the sum of the height of the projection 23 and the thickness of the box peripheral portion 25)–(the distance between the design wall 36D and the engaging wall 36E) preferably ranges from 0.2 to 1.0 mm, ranges from 0.3 to 0.8 mm, and ranges from 0.4 to 0.6 mm.

Modifications

Other than the above-described structures, for example, the box peripheral portion 25 is allowed to have elasticity by forming the box peripheral portion 25 of an elastic material such as rubber or adhering a rubber sheet or the like to the box peripheral portion 25. In this case, the box peripheral portion 25 and the design window frame portion 35 come into pressure contact with each other due to elastic restoring force, of the box peripheral port ion 25, which is accumulated by the box peripheral portion 25 being compressed in the thickness direction. In this case, the design panel 3 is allowed to be a rigid member which is unlikely to be elastically deformed. That is, in this case, the design window frame portion 35 is elastically deformable or is not elastically deformable.

Figure 5:
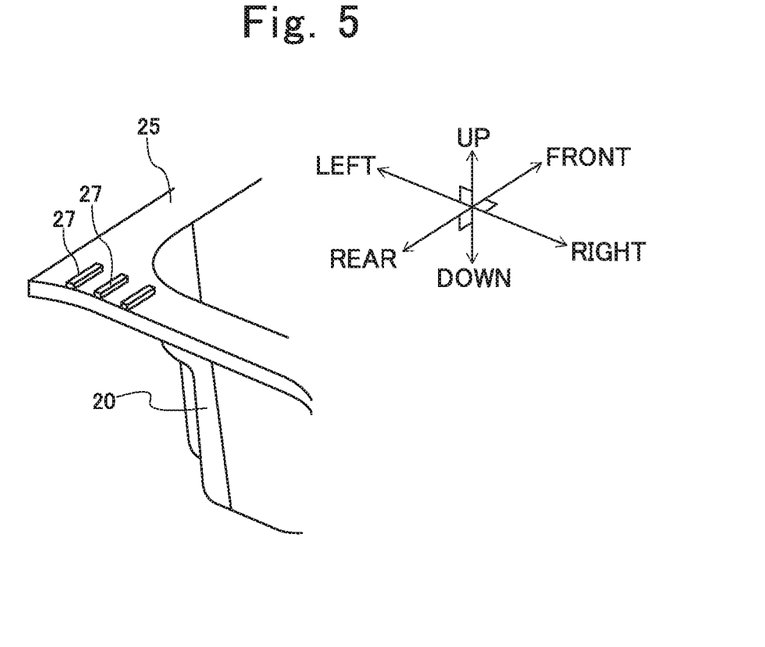
FIG. 5 schematically illustrates a rear side portion of a storage box in an on-vehicle storage device according to a modification.

Alternatively, the box peripheral portion 25 has ribs 27 instead of the projections 23. In this case, the ribs 27 preferably extend along the first direction, as shown in FIG. 5.

Figure 6:
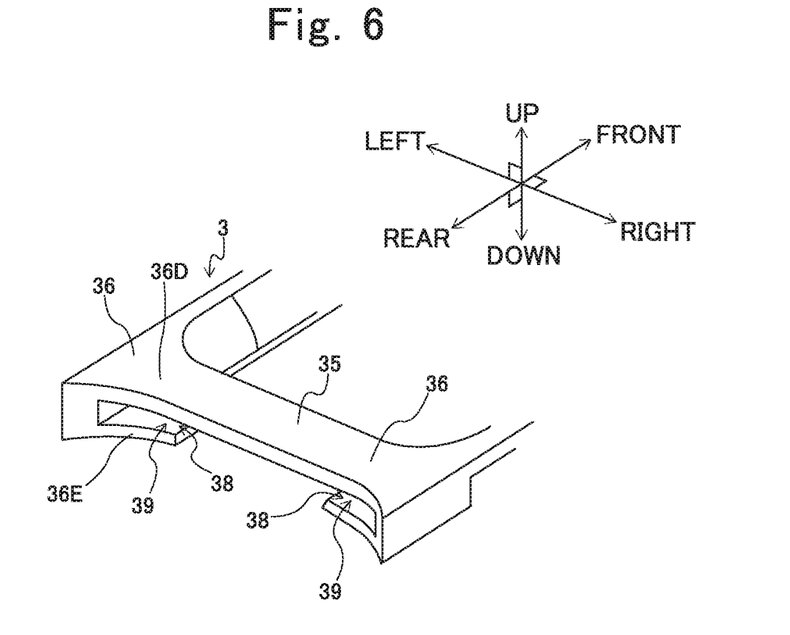
FIG. 6 schematically illustrates a rear side portion of a design panel in an on-vehicle storage device according to a modification.

Alternatively, instead of the projections 23, as shown in FIG. 6, the elastically-deformable portion 36 has a portion at which the distance between the design wall 36D and the engaging wall 36E is short. The portion at which the distance between the design wall 36D and the engaging wall 36E is short is referred to as a short-distance portion 39.

When the box peripheral portion 25 and the design window frame portion 35 engage with each other, the box peripheral portion 25 presses the design wall 36D and the engaging wall 36E so as to increase the space therebetween at the short-distance portion 39, thereby elastically deforming the elastically-deformable portion 36. Therefore, also in this case, the box peripheral portion 25 and the design window frame portion 35 come into pressure contact with each other due to elastic restoring force of the elastically-deformable portion 36, to stably maintain engagement between the box peripheral portion 25 and the design window frame portion 35.

In this case, the short-distance portion 39 is preferably disposed on the leading end side of the engaging wall 36E in the elastically-deformable portion 36 in order to elastically deform the elastically-deformable portion 36 with efficiency. The engaging wall 36E has a free end on the leading end side, and an opening 38 is formed between the engaging wall 36E and the design wall 36D. The portion is greatly deformed with a small force. Therefore, the short-distance portion 39 is disposed suitably at this portion.

Figure 7:
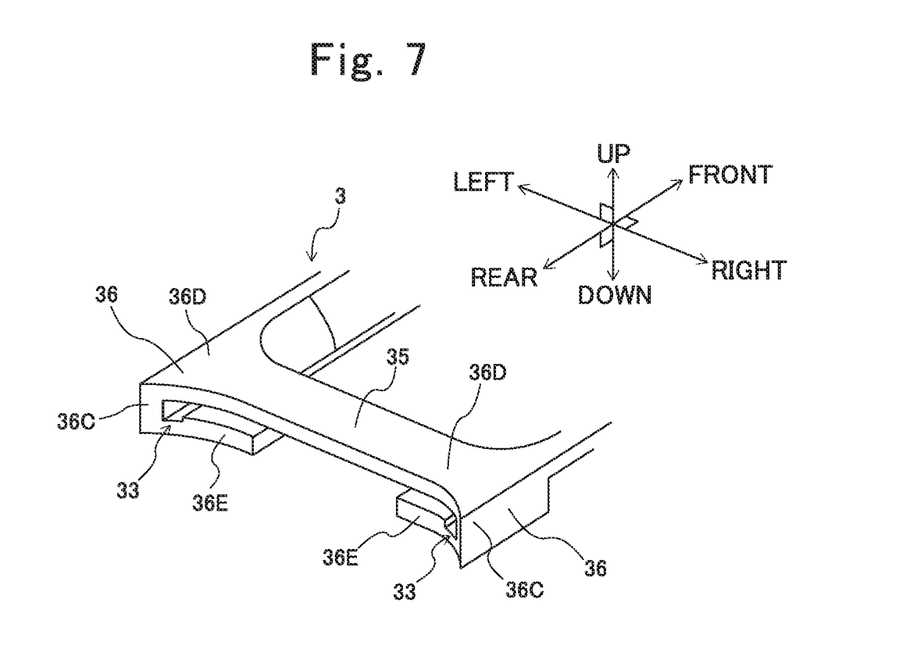
FIG. 7 schematically illustrates a rear side portion of a design panel in an on-vehicle storage device according to a modification.

As shown in FIG. 7, a small-thickness portion is allowed to be disposed at the connecting wall 36C or the engaging wall 36E. The small-thickness portion of the connecting wall 36C or the engaging wall 36E is referred to as an easily-deformable portion 33. When the easily-deformable portion 33 is disposed at the connecting wall 36C or the engaging wall 36E, the elastically-deformable portion 36 is elastically deformed with efficiency. The easily-deformable portion 33 is preferably disposed near the boundary between the engaging wall 36E and the connecting wall 36C, as shown in FIG. 7.

The present invention is not limited to the embodiments described above and shown in the drawings, and modification is made as appropriate to implement the invention without departing from the gist of the invention. Furthermore, components in the embodiments and the like described above are allowed to be freely extracted and combined to implement the invention.

The invention claimed is:

1. An on-vehicle storage device comprising:
a storage box including a box body having a storage space and having an upward-facing opening, and a box peripheral portion disposed at a peripheral edge of the opening; and
a design panel disposed on an upper side of the storage box, the design panel configured to have a window portion facing the opening, and a design window frame portion that is disposed at a peripheral edge of the window portion and that faces the box peripheral portion, wherein
the design window frame portion and the box peripheral portion are slidable relative to each other in a first direction intersecting an up-down direction while engaging with each other,
the storage box and the design panel are combined with each other by sliding in the first direction,
the window portion defines a hole through which the storage space of the storage box communicates with the outside of the on-vehicle storage device when the storage box and design panel are combined with each other, and
a connecting wall of the design window frame portion or an engaging wall of the design window frame portion comprises an easily-deformable portion at which a thickness of the engaging wall or a thickness of the connecting wall is reduced.

2. The on-vehicle storage device according to claim 1, wherein at least a part of the design window frame portion includes
a design wall that covers an upper surface of the box peripheral portion,
the engaging wall that covers a lower surface of the box peripheral portion, and
the connecting wall that extends in the up-down direction and connects between the design wall and the engaging wall.

3. The on-vehicle storage device according to claim 1, wherein the design window frame portion engages with the box peripheral portion while being elastically deformed.

4. The on-vehicle storage device according to claim 1, further comprising a locking element configured to inhibit the storage box and the design panel from moving relative to each other in a direction opposite to a combining direction in the first direction.

5. The on-vehicle storage device according to claim 1, wherein the easily-deformable portion is disposed at the connecting wall.

6. The on-vehicle storage device according to claim 1, wherein the easily-deformable portion is disposed at the engaging wall.

7. The on-vehicle storage device according to claim 1, wherein a dimension of an outer shape of the window portion is tapered from an upper side of the window portion toward a lower side of the window portion, and the lower side of the window portion is connected to the opening.

8. The on-vehicle storage device according to claim 2, wherein
the box peripheral portion has a plurality of projections disposed at positions which face the design wall of each of the plurality of elastically-deformable portions, and
a sum of a thickness of the box peripheral portion and a height of a projection of the plurality of projections is greater than a distance between the design wall and the engaging wall.

* * * * *